(12) United States Patent
Lan et al.

(10) Patent No.: US 6,717,331 B1
(45) Date of Patent: Apr. 6, 2004

(54) PIEZOELECTRIC ULTRASONIC MOTOR WITH MULTI-LAYER THIN DISKS

(75) Inventors: Yung-Sung Lan, Hsinchu (TW); Ching-Hsing Huang, Hsinchu (TW); Chi-Lone Chang, Hsinchu (TW); Minsun Ouyang, Hsinchu (TW); Yu-Chien Huang, Hsinchu (TW); Hsiang-Chieh Yu, Hsinchu (TW); Chen-Yuan Huang, Taipei (TW); Tzuan-Ren Jeng, Hsinchu (TW); Jau-Jiu Ju, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 74 days.

(21) Appl. No.: 10/403,051

(22) Filed: Apr. 1, 2003

(30) Foreign Application Priority Data

Dec. 30, 2002 (TW) ........................ 91137902 A

(51) Int. Cl.[7] .............................................. H01L 41/08
(52) U.S. Cl. ................................................ 310/323.02
(58) Field of Search ........................... 310/323.02, 328, 310/316.01–316.02, 317

(56) References Cited

U.S. PATENT DOCUMENTS

| | | | | | |
|---|---|---|---|---|---|
| 4,857,793 A | * | 8/1989 | Okuno | ................. | 310/323.02 |
| 5,073,739 A | * | 12/1991 | Iijima et al. | ........... | 310/323.02 |
| 5,561,337 A | * | 10/1996 | Toda | .................... | 310/323.02 |
| 6,104,122 A | * | 8/2000 | Ishimaru | ................ | 310/323.02 |
| 6,489,705 B1 | * | 12/2002 | Ouyang et al. | ........ | 310/323.02 |

* cited by examiner

Primary Examiner—Thomas M. Dougherty
Assistant Examiner—Karen Beth Addison
(74) Attorney, Agent, or Firm—Birch, Stewart, Kolasch & Birch, LLP

(57) ABSTRACT

This specification discloses a piezoelectric ultrasonic motor with multi-layer thin disks. A buzzer disk made of a piezoelectric material is supplied with an alternate voltage to produce alternately expanding and shrinking deformation. An elastic vibration disk in connection with the buzzer disk produces standing waves to transport kinetic energy to the exterior. A driving module symmetric in the vertical or horizontal direction is also formed. This does not only reduce the abrasion among the components, but also provide homogeneous forward and reverse driving forces.

11 Claims, 4 Drawing Sheets

PIEZOELECTRIC ULTRASONIC MOTOR WITH MULTI-LAYER THIN DISKS

BACKGROUND OF THE INVENTION

1. Field of Invention

The invention relates to an ultrasonic motor used in the precision opto-electrical manufacturing industry, and more particularly, to an piezoelectric ultrasonic motor with multi-layer thin disks that can produce homogeneous forward and reverse driving forces.

2. Related Art

To improve human life, many scientists and inventors produced many convenient devices and mechanisms. In particular, the introduction of the electromagnetic motor had brought great progress to the world. It had been invented more than one hundred years ago. Since then, the electromagnetic motors had been widely used in machine-related manufacturing industries. However, aside from new discoveries in superconductors and magnetic materials, there is not much progress in motors. It is very hard for either conventional motors or small motors with sizes less than 1 cm to overcome the problem of power conversion rate. Therefore, a new motor driven by high power ultrasonic wave energy has received a lot of attention by the public. We call this kind of motor the ultrasonic motor.

Although this type of motors has a different mechanical structure, it is still based upon the same theory, which was proposed by V. V. Lavrinekon and P. E. Vasilievthe in the former Soviet Union. Due to the unstable structure, is had not been widely used until 1980s. After the semiconductor industry arose, a motor that is free from electromagnetic interference (EMI) and also capable of performing precision controls is needed. Such an urgent need accelerated the development of ultrasonic motors. In fact, the first ultrasonic motor was introduced by H.V. Barth at IBM in 1973, starting the new era of ultrasonic motors. In the past decade, the manufacturing technique for ultrasonic motors had tremendous progress. which is particularly true in Japan.

The ultrasonic motor uses the elastic vibrations produced by ultrasonic waves (with a frequency above 20 kHz) to obtain the driving force. Such a driving force brings the rotor into motion by friction. An alternate voltage as a driving source is supplied to a piezoelectric ceramic to produce alternate expanding and shrinking motions. Although the expanding and shrinking scale is only a few micrometers ($\mu$m), the frequency is hundreds of thousand times per second and thus the piezoelectric ceramic can move several centimeters per second. This is ideal for related scientific products.

Although this type of ultrasonic motors has the advantages of being quiet, efficient, small and light, it has the problem of abrasion. Moreover, the forward and reverse driving forces are different, resulting in a big difference in the output power. Thus, there are great troubles in practical uses.

SUMMARY OF THE INVENTION

In view of the foregoing, the invention provides a piezoelectric ultrasonic motor with multi-layer thin disks. Several sets of symmetric buzzer disks are employed to produce expanding and shrinking deformations to transport kinetic energy to the exterior. Therefore, not only can homogeneous forward and reverse driving forces be provided, the driving ability and elasticity of the whole system are largely enhanced while the abrasion is reduced.

The disclosed piezoelectric ultrasonic motor with multi-layer thin disks mainly includes several sets of driving modules. The driving module contains two symmetric buzzers, which of which consisting of a buzzer disk and a connected elastic vibration disk. The buzzer disk is made of a piezoelectric ceramic, and the elastic vibration disk is a metal. The buzzer disk is installed with three fixing elements. When the buzzer disk is supplied with an alternate voltage, it undergoes alternate expanding and shrinking deformations. Through the fixing elements, the elastic vibration disk generates mechanical waves that propagate along the radial and arc directions. A standing wave thus forms on the edge of the elastic vibration disk. Although the deformation is only several micrometers in scale, the driven object can be moved by several centimeters as the deformation frequency is tens of thousand times per second. The motor provides a highly precise driving force. By controlling the frequency of the alternate voltage, different motion speeds can be provided to the external object. Moreover, the boundary conditions of the buzzer disks in the two buzzers of the driving module are opposite so that the driving force is in unison. Therefore, when supplying the buzzer an alternate voltage for a forward driving force, the other symmetric buzzer is supplied with an auxiliary alternate voltage so that they both provide forward driving forces together. When one needs a reverse driving force, all he or she needs to do is to reverse the alternate voltage input. Consequently, the same driving force is provided no matter it is forward or reverse in direction.

The disclosed ultrasonic motor utilizes several sets of driving module consisted of two buzzers with opposite boundary conditions to provide a high driving force that is smooth in both forward and reverse directions. Since the driving modules are connected in series, the contact area between the driving modules and the external driven object increases. The area of each individual part can be made smaller, minimizing the size of the whole module without sacrificing the output driving force. Moreover, modifying the arrangement of the driving modules can produce different functions for various applications. Therefore, the invention can solve the problem of a big difference in the forward and reverse driving forces as in the prior art. It greatly increases the stability and elasticity of the system, rendering a smoother motion with less friction.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
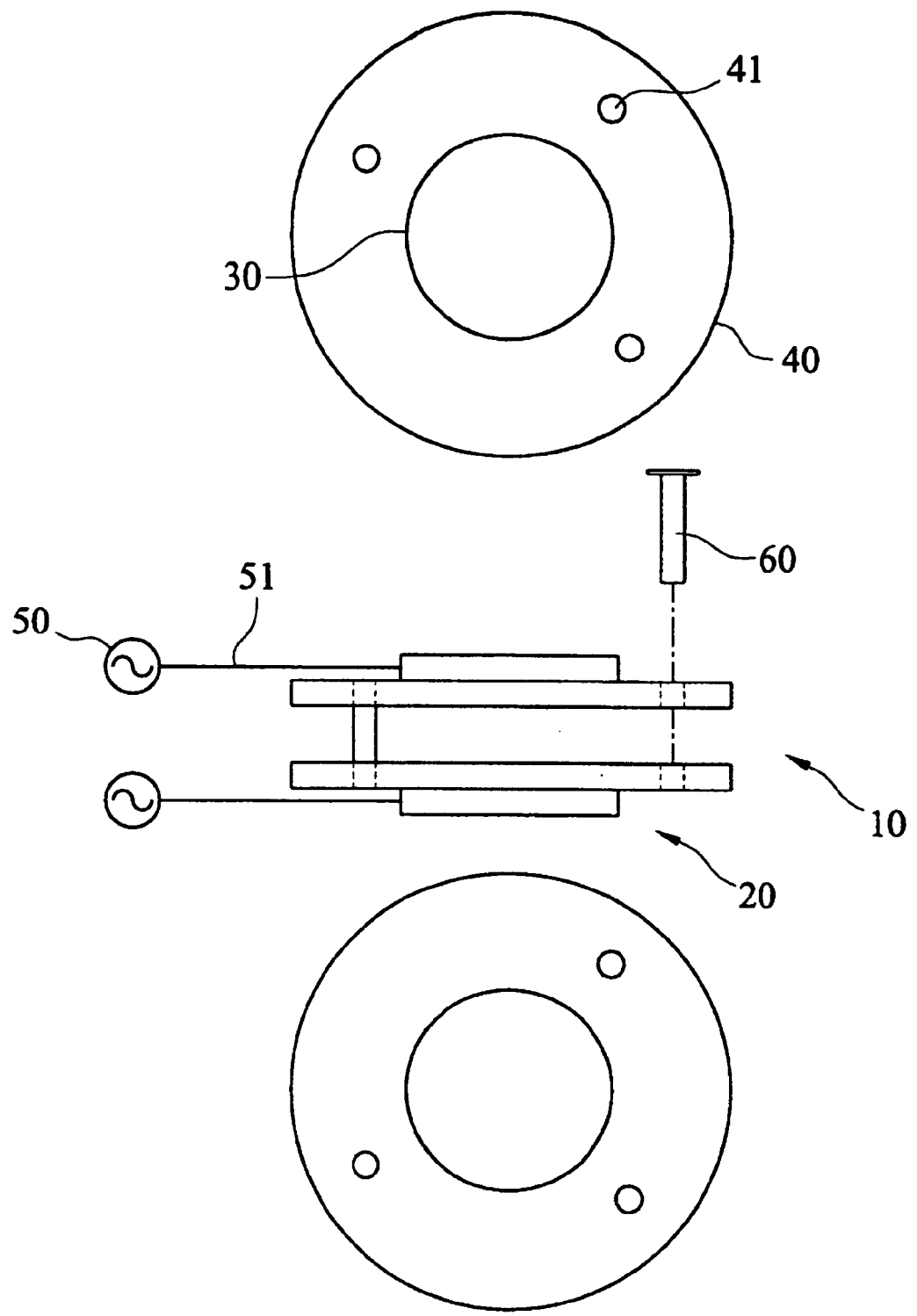
FIG. 1 is a schematic exploded view of the disclosed piezoelectric ultrasonic motor with multi-layer thin disks.

Please refer to FIG. 1, an exploded view of the disclosed piezoelectric ultrasonic motor with multi-layer thin disks. The driving module 10 contains two symmetric buzzers 20. Each buzzer 20 contains a buzzer disk 30 and a connected elastic vibration disk 40. The buzzer disk 30 is circular and made of a piezoelectric ceramic. The elastic vibration disk 40 is usually made of metals, with a shape similar to the buzzer disk 30 but having a larger diameter. The elastic vibration disk 40 is installed with three asymmetric through holes 41. Fixing elements 60 (such as the usually screws or equivalent elements) are used to connect the symmetric buzzers 20 by going through the through holes 41.

An external high-frequency power supply 50 provides an alternate voltage to the buzzer disk 30 via a power line 51. As a result of the reverse piezoelectric effect, the buzzer disk 30 produce alternate expanding and shrinking deformations. Such deformation brings the connected elastic vibration disk 40 into motion. Standing waves are produced to propagate in the radial and arc directions, providing kinetic energy to the exterior. Although the deformation is only several micrometers in scale, the driven object can be moved by several centimeters as the deformation frequency is tens of thousand times per second. The motor provides a highly precise driving force. By controlling the frequency of the alternate voltage supplied by the high-frequency power supply 50, different driving forces can be output to the exterior so that the driven object gains different motion speeds. Moreover, the boundary conditions of the buzzer disks 30 in the two buzzers 20 of the driving module 10 are opposite to each other to produce a driving force in the same direction. When the buzzer disk 30 of the upper buzzer 20 is supplied with an alternate voltage for a forward rotation, the buzzer disk 30 of the lower buzzer 20 is supplied with an auxiliary alternate voltage also for a forward rotation. The driving forces from the two buzzers 20 are in unison. The only difference is that the upper buzzer 20 provides a larger driving force than the lower one. Likewise, when the external driven object requires a reverse driving force, one only needs to interchange the above-mentioned input alternate voltage.

For example, if the upper buzzer 20 does work so that the external driven object gains a motional speed of 4 cm/s, the lower buzzer 20, having an opposite boundary condition to that of the upper buzzer 20, only provides the driven object an additional speed of 1.5 cm/s. The total speed of the object is then 5.5 cm/s. During the reverse motion, the upper buzzer 20 provides the driven object a speed of 1.5 cm/s while the lower one 20 provides another 4 cm/s, still totaling a speed of 55.cm/s. From the above description, one sees that the motor provides a homogeneous driving force of the same magnitude but opposite in direction in either the forward or reverse direction.

Figure 2:
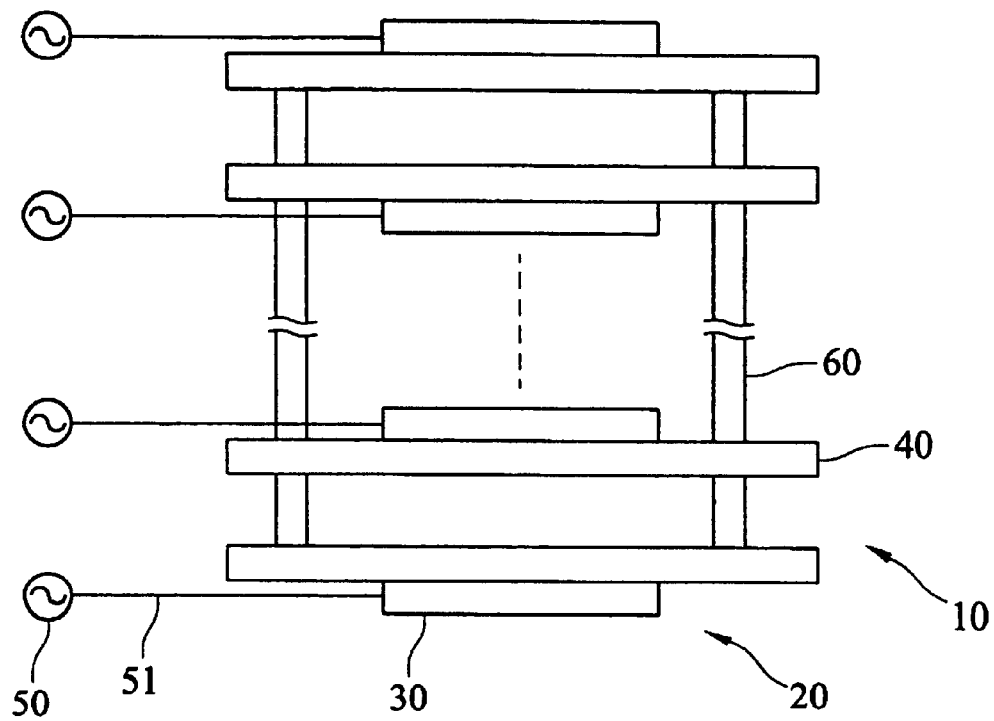
FIG. 2 is a first embodiment of the invention.

As in the first embodiment of the invention shown in FIG. 2, one can connect several sets of driving modules 10 in series according to different needs so that the driven object can gain homogeneous but larger driving forces in both forward and reverse directions.

Figure 3:
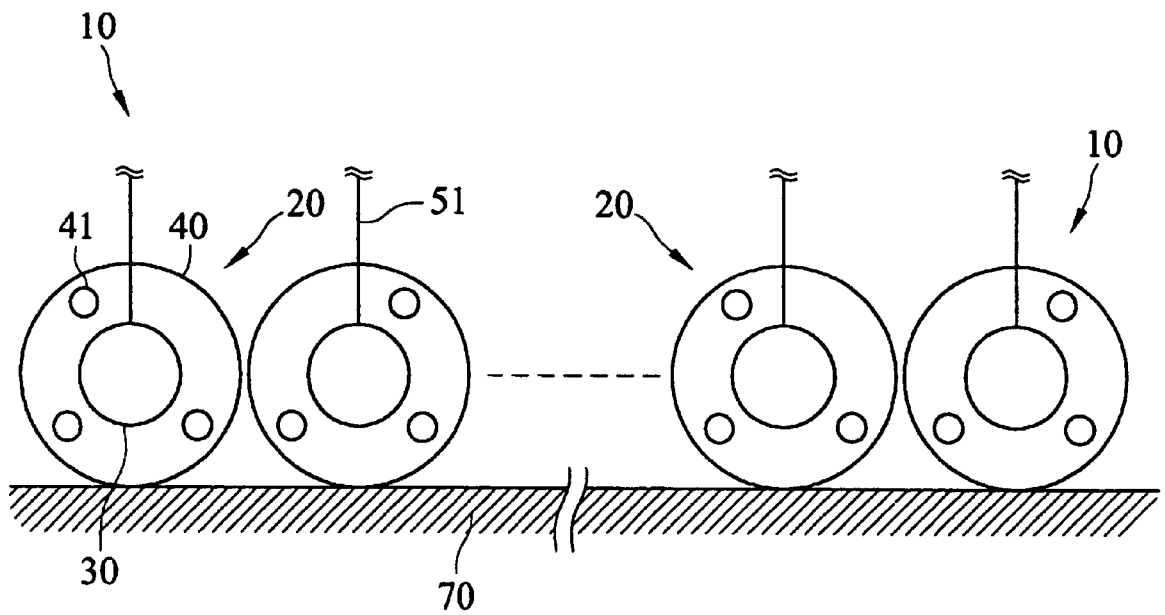
FIG. 3 is a second embodiment of the invention.

In addition to the serial connection in the vertical direction, one may also connect the symmetric buzzers 20 of the driving module 10 in the horizontal direction, as in the second embodiment of the invention shown in FIG. 3. In particular, the boundary conditions of the buzzer disks 30 of the adjacent buzzers 20 are opposite to each other. According to different design requirements, several sets of driving modules 10 are connected in series to provide a smoother and larger driving force to the driven object 70 in both the forward and reverse directions.

Figure 4:
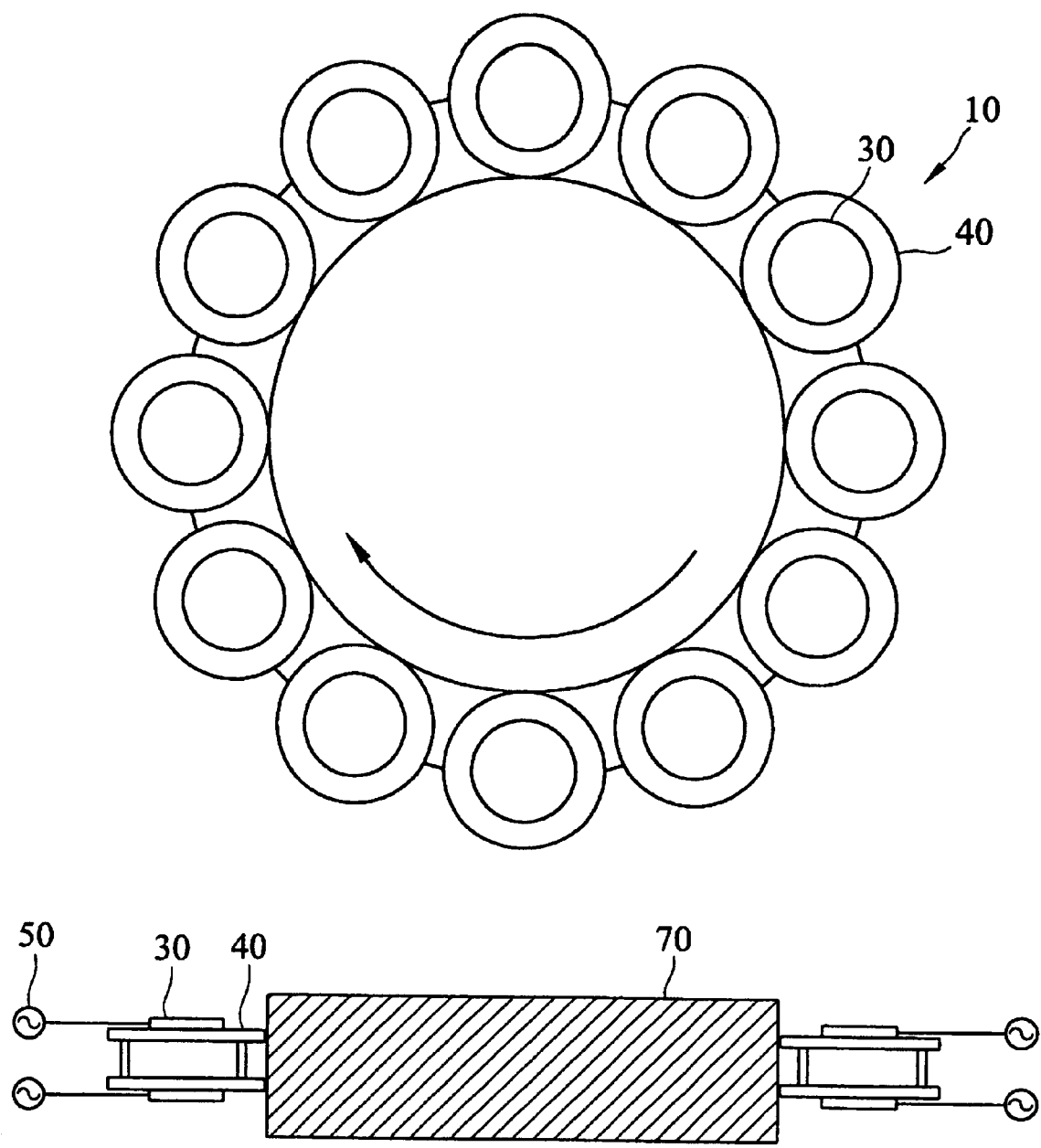
FIG. 4 is a third embodiment of the invention.
Figure 5:
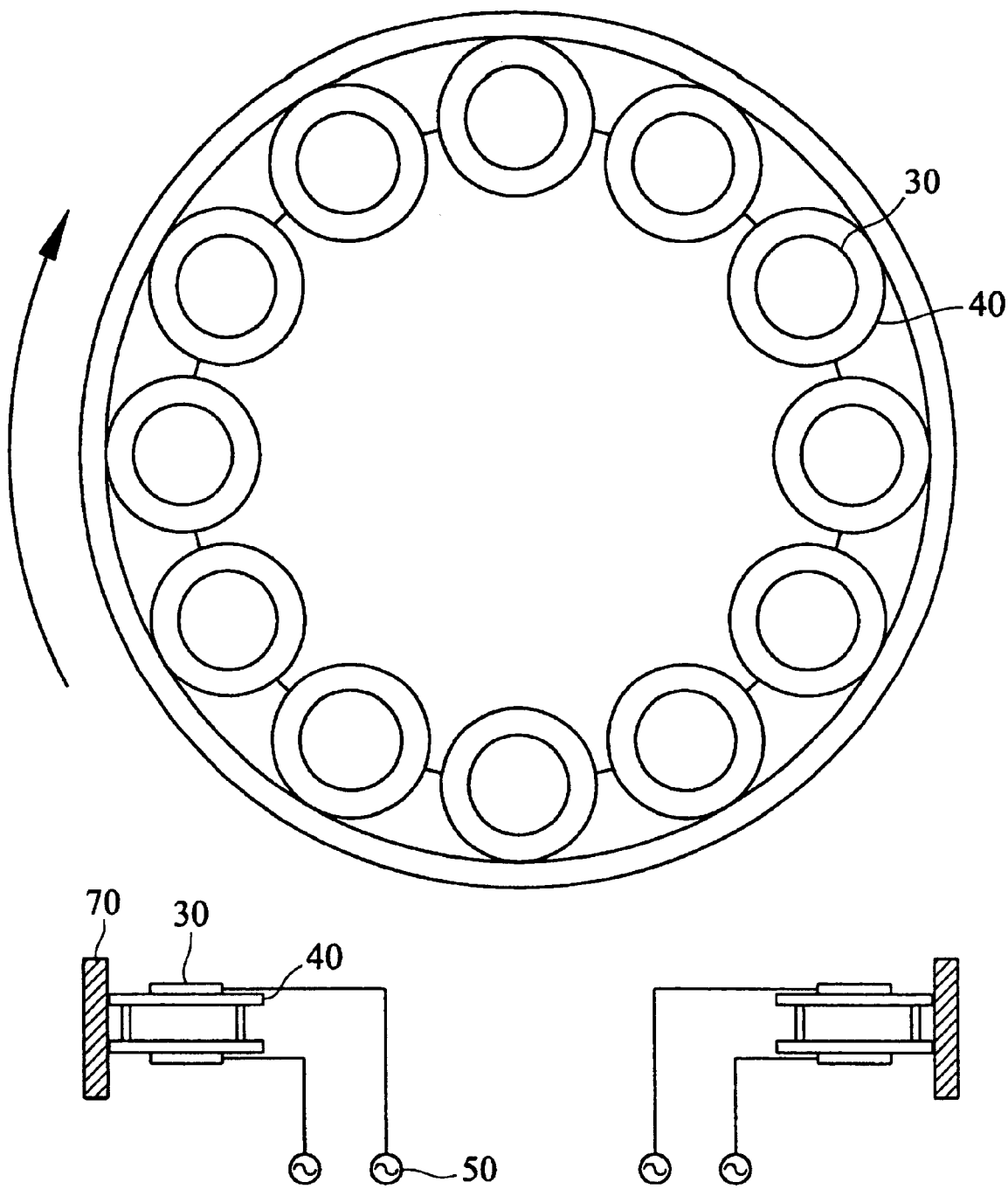
FIG. 5 is a fourth embodiment of the invention.

The design concept is not limited to axial linear motions but can be extended to other different motions, as shown in FIGS. 4 and 5. As shown in FIG. 4, several driving modules 10 are disposed around the outer side of the shaft 70 in the third embodiment of the invention. A high-frequency power supply 50 provides the required electrical power so that the shaft 70 rotates clockwise or counterclockwise. It should be mentioned that the current embodiment is formed using the vertical connection scheme as in the first embodiment. It can also use the horizontal connection scheme in the second embodiment.

FIG. 5 shows the same action principle achieved in a different arrangement. The driving modules are disposed inside of the shaft 70. As in the previous embodiment, a high-frequency power supply 50 provides the required electrical power so that the shaft 70 rotates clockwise or counterclockwise. It is also clear that the current embodiment is formed using the vertical connection scheme as in the first embodiment. It can also use the horizontal connection scheme in the second embodiment.

Certain variations would be apparent to those skilled in the art, which variations are considered within the spirit and scope of the claimed invention.

What is claimed is:

1. A piezoelectric ultrasonic motor with multi-layer thin disks for driving a passive object, the motor comprising:
    a plurality of driving modules, each of which contains two buzzers comprising:
        a buzzer disk, which is made of a piezoelectric material; and
        an elastic vibration disk, which is connected to the buzzer disk and has at least three asymmetric through holes via which the elastic vibration disk is fixed using fixing elements;
    wherein the buzzer disk is supplied with an alternate voltage to produce alternate and periodic expanding and shrinking deformations, resulting in a periodic standing wave on the elastic vibration disk to drive the passive object, and the two buzzers of the driving module are disposed along the driven direction of the passive object in a symmetric way.

2. The motor of claim 1, wherein the buzzers are disposed parallel to the driven direction of the passive object.

3. The motor of claim 1, wherein the buzzers are disposed in the vertical direction of the driven direction of the passive object.

4. The motor of claim 1, wherein the fixing element is a screw.

5. The motor of claim 1, wherein the buzzer disk is made of a piezoelectric ceramic.

6. The motor of claim 1, wherein the elastic vibration disk is made of a metal.

7. The motor of claim 6, wherein the metal is $Pb(Zr,Ti)O_3$ (PZT).

8. The motor of claim 1, wherein the two buzzers of the driving module is supplied with alternate voltages of different frequencies so that the buzzer disks of the buzzers actuate the elastic vibration disks to bring the passive object into motion in unison.

9. The motor of claim 1, wherein the buzzers provide different driving forces to the passive object as the frequencies of the supplied alternate voltages change.

10. The motor of claim 1, wherein the driving modules are disposed around the outer side of the passive object.

11. The motor of claim 1, wherein the driving modules are disposed along the inner side of the passive object.

* * * * *